Sept. 28, 1943.  A. ZUNZER  2,330,656
CLEARING DEVICE FOR AIR DUCTS IN THE LIP OF CASTING POTS
Filed April 24, 1941
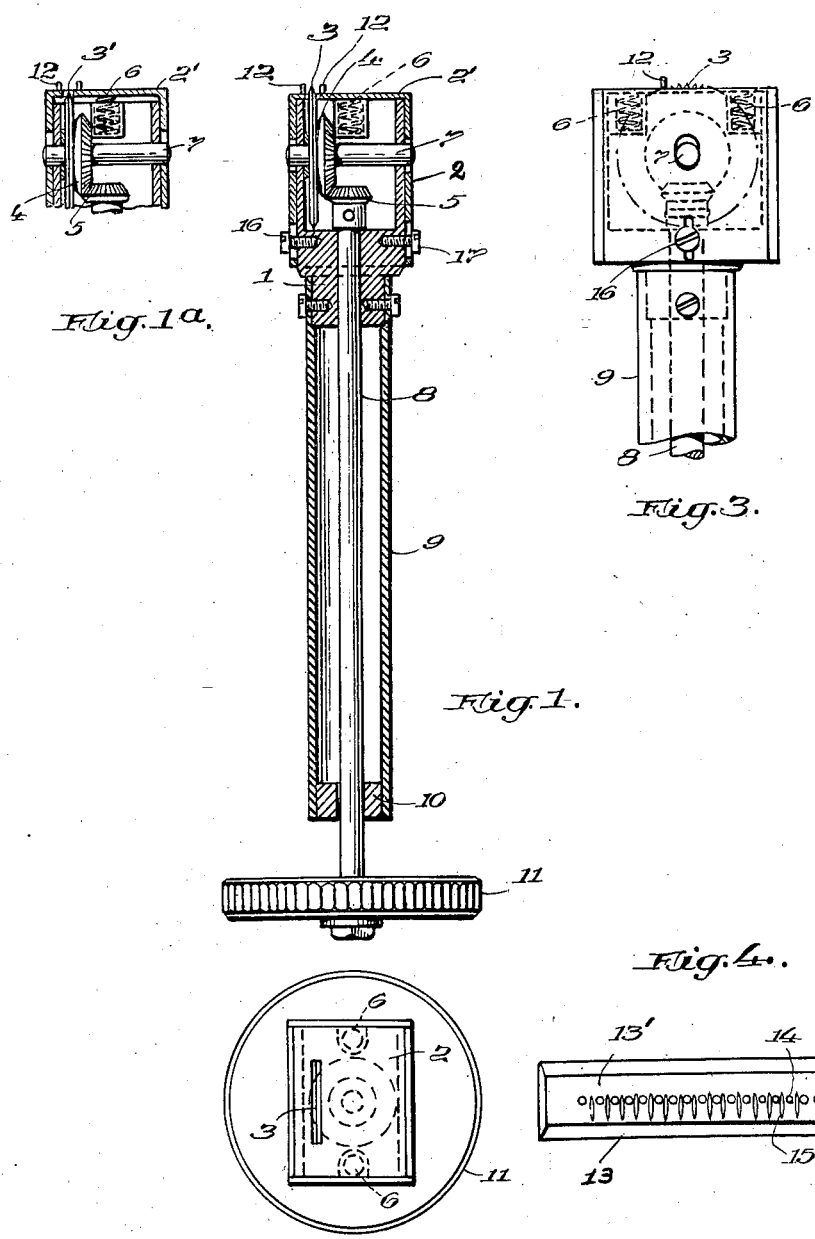

Patented Sept. 28, 1943

2,330,656

UNITED STATES PATENT OFFICE 2,330,656

CLEARING DEVICE FOR AIR DUCTS IN THE LIP OF CASTING POTS

Adolf Zunzer, Waldshut, Hochrhein, Germany; vested in the Alien Property Custodian Application April 24, 1941, Serial No. 390,206
In Germany April 29, 1940

4 Claims. (Cl. 90—12)

As is known, the lip of casting pots of type-setting machines is provided at its operating surface with a number of holes between which there are hollowed out air ducts. When type-setting machines are in use, these air ducts require clearing from time to time, a work which hitherto was mostly done by the operator of the type-setting machine with a hammer and a chisel. This "recutting" of the air ducts caused considerable difficulties, especially because the accuracy and efficiency of this work entirely depended upon the skill of the operator and the suitability of the tools used for this purpose. Accordingly, as every expert knows, this work very often causes considerable disturbances, particularly if it is done by an unskilled operator. Thus, by one-sided recutting, the casting lip was often displaced, and there resulted lateral elevations of material which made it necessary to file the lip. All these uncertainties in clearing the air ducts required a lengthy adapting of the casting lip to the mould. These difficulties are further increased by the fact that, as already mentioned, skilled operators are mostly not available for this purpose in printing offices.

As a result of the difficulties mentioned above, the problem solved by the present invention consists in making the work of clearing the air ducts at the lip of casting pots of type-setting machines during operation independent of said circumstances, that is, in developing a device which will enable even an inexperienced and unskilled operator to do the clearing in a perfect manner.

A constructional example of the subject of the invention is illustrated in the accompanying drawing, in which—

Fig. 1 shows a section of the new device along the axis of the driving shaft;

Fig. 1a shows the head of the device in the position of rest;

Figs. 2 and 3 are views of the device as seen from above and from the side; and

Fig. 4 shows the lip of a casting pot of a type-setting machine.

In the constructional form illustrated, the housing for the milling cutter consists of a box-shaped head 1, which is open at the front and which is fixed upon a tubular handle 9. This tube contains the driving spindle 8 driven by means of the hand wheel 11, one end of said spindle being held in a bearing place of the head 1, and the other end in a bearing bush 10 of the tube 9. This spindle carries within the head 1 a bevel wheel 5. The latter engages a bevel wheel 4 which is fixed upon a transverse spindle 7 rotatable in bearing places of the wall of the head 1, but not shiftable. The spindle 7, the bevel wheel 4, and the milling cutter 3, which is also placed upon the spindle, together form a rigidly connected rotatable aggregate arranged in the box of the head 1. Upon the box of the head 1, which is open at the front, there is placed a lid-like slide or closure member 2, the front closing wall 2' of which covers the opening in the head 1. This slide is shiftable by means of slots 16 upon screw bolts 17 of the head 1 in axial direction.

In the plane of the disc-shaped milling cutter 3 the front wall 2' of the slide 2 is provided with a slot 3' of suitable width and length, through which, when the slide 2 is pressed down on the head 1, the milling cutter will project, as shown in Fig. 1. In the position of rest this is prevented by two pressing springs 6 arranged in bearing places in the head 1. These springs tend to press the slide into its raised position, in which, as will be seen from Fig. 1a, the milling cutter is completely covered by the housing. On both sides of the slot 3' for the milling cutter 3, the slide 2 is provided with two set pins 12, whose purpose will be explained below.

The operating surface 13' of the lip 13 of the casting pot is provided with a number of outlet holes or funnels 14, as diagrammatically illustrated in Fig. 4; between each pair of these funnels there is arranged in usual manner an air duct 15.

The operation of the new device is as follows:

As soon as it becomes necessary to clear the air ducts 15, the operator takes the device by the handle 9 and places the set pins 12 into two neighboring funnels 14 of the lip of the casting pot. In doing so, the milling cutter 3 is placed exactly upon the air duct to be cleared. Now, the operator causes the milling cutter to rotate by means of the hand-wheel 11, and at the same time presses the front wall 2' of the slide 2 against the operating surface 13' of the lip of the casting pot. Thereby the slide 2 is shifted towards the hand-wheel 11 against the pressure of the springs 6, permitting the milling cutter 3 to gradually enter the air duct to be cleared. When this is done, the device is placed upon the next air duct in the manner described above.

What is claimed is:

1. A tool for clearing air ducts in the lip of casting pots of type-setting machines, comprising a handle member, a milling cutter supported at one end of said handle member, means providing a housing for the cutter and said housing being carried by the handle member and having a movable wall with a slot therethrough aligned with the cutting edge of said cutter, drive means for the cutter extending through the handle and housing, and spring means normally maintaining said housing in a position enclosing the cutter and said housing being shiftable against the action of said spring means upon engagement with the lip of the casting pot for permitting the cutting edge of said cutter to extend through the said slot in order to operate within the lip of the casting pot.

2. A tool for clearing air ducts in the lip of casting pots of type-setting machines, comprising a handle member, housing means supported by the handle member and including fixed and movable telescoping members, a milling cutter carried by the fixed housing member and said movable housing member having a slot therethrough aligned with the cutting edge of the said cutter, spring means normally forcing the movable housing member outwardly to a position enclosing the said cutter and said movable housing member being shiftable inwardly against the action of said spring means upon engagement with the lip of the casting pot for permitting the cutting edge of the said cutter to extend through the said slot in order to operate within the lip of the casting pot, and drive means for the cutter extending through the handle and housing including a gear transmission in the housing.

3. A tool for clearing air ducts in the lip of casting pots of type-setting machines, comprising a handle member having an open-ended skirt portion at one end thereof, a shaft journalled in said skirt portion, a milling cutter fixed to said shaft, a closure member slidably mounted on said skirt portion and having a closing wall with a slot therethrough in alignment with the cutting edge of said closure member, spring means normally forcing said closure member outwardly with respect to the skirt portion in order to enclose the said cutter, means extending through the handle into the housing for rotating said shaft and the said cutter, and stop means carried by the closing wall of said closure member and adapted to cooperate with the lip of the casting pot for locating the milling cutter and for permitting inward movement of the closure member whereby the cutter will extend through the said slot and enter the air duct to be cleared.

4. A tool for clearing air ducts in the lip of casting pots of type-setting machines, comprising a handle member carrying spaced aligned bearings, a tool operating shaft extending through said bearings, an open-ended skirt portion at one end of said handle, a transverse stub shaft journalled in said skirt portion, a milling cutter fixed to said stub shaft, intermeshing gears on said operating shaft and said stub shaft for transmitting rotation to the cutter, a closure member telescoping with said skirt portion and slidably mounted thereon with the closing wall of the closure member provided with a slot aligned with the cutting edge of said cutter, spring means normally forcing said closure member outwardly whereby to enclose the cutting edge of the cutter, and locating pins carried by the closing wall of said closure member and adapted to cooperate with the lip of the casting pot for locating the cutter and permitting inward movement of the said closure member so that the cutting edge of the said cutter will extend through the said slot and into the air duct to be cleared.

ADOLF ZUNZER.